US006528788B1

(12) United States Patent
Galloway

(10) Patent No.: US 6,528,788 B1
(45) Date of Patent: Mar. 4, 2003

(54) DETECTION OF POSITION AND MOTION OF SUB-PIXEL IMAGES

(75) Inventor: John Lindsay Galloway, Northants (GB)

(73) Assignee: Infrared Integrated Systems, Towcester (GB)

( * ) Notice: Subject to any disclaimer, the term of this patent is extended or adjusted under 35 U.S.C. 154(b) by 0 days.

(21) Appl. No.: 09/643,099

(22) Filed: Aug. 21, 2000

(30) Foreign Application Priority Data

Aug. 27, 1999 (GB) .......................................... 9920443

(51) Int. Cl.[7] ............................................ G01J 5/10

(52) U.S. Cl. ............................................... 250/332

(58) Field of Search ........................... 250/332, 338.3, 250/353, 342, DIG. 1; 240/567

(56) References Cited

U.S. PATENT DOCUMENTS

| | | | | | |
|---|---|---|---|---|---|
| 3,581,092 | A | * | 5/1971 | Pearsall et al. | 250/338.3 |
| 5,101,194 | A | | 3/1992 | Sheffer | 341/567 |
| 5,229,594 | A | | 7/1993 | Vilaire et al. | 250/206.2 |
| 5,311,305 | A | | 5/1994 | Mahadevan et al. | 348/169 |
| 5,332,176 | A | * | 7/1994 | Wootton et al. | 382/103 |
| 5,565,683 | A | * | 10/1996 | Ando | 250/342 |

FOREIGN PATENT DOCUMENTS

| | | | |
|---|---|---|---|
| EP | 0656532 | A2 | 6/1995 |
| GB | 2 208 256 | A | 3/1989 |
| GB | 2 231 740 | B | 11/1990 |
| JP | 56143965 | | 10/1981 |

OTHER PUBLICATIONS

European Search Report dated Dec. 28, 2001, 3 pages.
The Patent Office, Search Report for GB 9920443.0 dated Nov. 4, 1999, 5 pages.

* cited by examiner

*Primary Examiner*—Constantine Hannaher
(74) *Attorney, Agent, or Firm*—Moser, Patterson & Sheridan, L.L.P.

(57) ABSTRACT

In order to determine the position of an object within an area viewed by a single detector of an array, signals from detectors adjacent to the single detector are compared with each other and/or the single detector. The method can be extended to larger objects to ascertain the locations of edges.

7 Claims, 3 Drawing Sheets

DETECTION OF POSITION AND MOTION OF SUB-PIXEL IMAGES

The present invention relates to a method of determining the position and/or motion of an object using an array of radiation detectors. The invention will be described below with reference to arrays of pyroelectric detectors but may be equally applicable to some other arrays of radiation detectors.

A pyroelectric sensor is composed of a thin piece of pyroelectric material with electrodes on the top and bottom surfaces. The pyroelectric material has the property that changes in incident (heat) energy are translated to electrical signals that can be taken from the electrodes via a suitable amplifier for signal processing.

One of the most common detectors of human movement is the Passive Infrared (PIR) detector used in intruder detectors and movement triggered automatic lights. Conventional PIR detectors use a small number of pyroelectric sensors in conjunction with an optical arrangement that defines the field of view and provides a modulated signal from a moving human, as described in more detail below. One consequence of this arrangement is that it is not possible to determine the location of the object within the field of view of the detector, and another is that gaps must be provided within the overall field of view for the detection method to operate, resulting in blind spots.

A solution to these shortcomings can be found by replacing the conventional pyroelectric sensor with an array of pyroelectric detectors and a unitary optical system. By tracking the movement of an object between adjacent detectors of the array, the angular position of the object with respect to the detector is known. This detection method is also outlined below. The use of an array also provides continuous coverage throughout the field of view.

The present invention provides a means for enhancing the performance of an array-based detector, primarily by allowing the detection of movement of an object within the field of view of a single detector in an array of detectors.

Description of a Conventional PIR Detector

With conventional PIR detectors, it is normal for the detector to comprise a pyroelectric sensor with 1, 2 or 4 sensitive detectors, an optical device defining the field of view of these detectors, an amplifier and signal processing circuitry.

The optical device is usually an array of lens segments arranged to direct the field of view of the sensor into a number of finger-like detection zones as shown in FIG. 1(*a*). When there is only a single detector in the pyroelectric sensor, each lens segment projects one detection zone, but when there are two or more pyroelectric detectors, each lens segment will project a detection zone for each detector in the sensor. FIG. 1(*a*) shows the most common arrangement, where there are two detectors in the sensor 1 and each lens segment A, B, C, D, E projects a pair of detection zones. The gaps in the coverage pattern can be seen between these detection zones.

The pyroelectric detectors are arranged so that one provides a positive signal when the heat from the object is focused upon it, while the other provides a negative signal when the heat is focused upon it. As is shown in FIG. 1(*a*), each lens segment will project a pair of detection zones, one with a positive sense and the other with a negative sense. The nature of the pyroelectric sensors is such that they detect changes in incident radiation but ignore steady state radiation.

As a person moves across the field of view of the arrangement described in FIG. 1(*a*), in the direction of arrow X, the radiation (heat) from the person is sensed when it is in one of the detection zones, and is lost when it moves into the gap between these zones. This process converts the steady heat output from the person to a modulated sequence of positive and negative signals, spaced apart by gaps, which occur when the person lies between the detection zones. When this modulated signal exhibits the size and time characteristics that correspond with a person, an alarm signal is generated by the detector. As the detection zones for all of the lens segments are projected onto the same detectors, it is not possible to identify through which lens segment the energy is being focused, so the location of the object cannot be identified. When the person is moving within one of the detection zones or within one of the gaps, for example when moving towards the detector, no modulation is applied to the radiated energy and the movement of the person is not detected.

In higher performance detectors the array of lenses is often replaced with an array of mirrors, but as these are optically equivalent, the detection method is essentially the same.

In an array-based detector, the overall field of view can be determined in the same way as for a conventional camera, by placing the array on the focal plane of an appropriate lens. Consider a sensor using an array of 25 detectors arranged in a 5×5 square. When the field of view is focused onto this array through a spherical lens, it is broken up into 25 "pixels" in a square pattern, matching the array (see FIG. 2(*b*)). It is as if the overall field of view had been overlaid by a square grid, with each detector of the array viewing one square of the grid A1, A2 . . . B1, B2 etc. In contrast to conventional pyroelectric sensors, the field of view of each detector of an array (pixel) is contiguous with its neighbours, providing continuous coverage throughout the field of view.

The obvious method for detecting movement and position using an array is to detect the movement of an object (or the edge of an object) from the field of view of one detector to another. This restricts the resolution of the detection process to the size of the field of view subtended by each detector of the array. In the case of a 15×15 array placed at the focus of a spherical lens with a 90° field of view, the field of view of each detector will subtend an arc approximately 1 m wide, at a distance of 10 m from the detector. As any movement of an object within this pixel is not detected, this sets a limit to the effective range that can be claimed when there is a requirement to detect a specified amount of movement by an object. If the detector were required to give an alarm with less than 0.5 m of movement by a person, the detector described above would have its effective range limited to less than 5 m. This issue is of importance in meeting regulatory requirements in certain applications areas.

THE INVENTION

The present invention can be used to determine the position and/or movement of an object within the field of view of a single detector in an array of detectors, thereby increasing the apparent resolution of the array. It also provides a mechanism for differentiating between static objects with modulated output energy, and objects oscillating about a mean position.

The proposed method applies to arrays constructed from single pieces of appropriate material and makes use of energy focused onto one detector of the array, being diffused onto adjacent detectors through the body of the material used to construct the array. This diffusion of energy has previously been considered a negative attribute of such detectors, as it reduces image sharpness. This invention turns this negative attribute into a benefit, expanding the capabilities of such detector arrays.

The present invention provides a method for determining the location and/or movement of an image within the field of view of one detector in an array of pyroelectric detectors constructed from a single piece of material and having an optical system for producing an image of an object on the array, comprising:

a) detecting the location of a first detector that contains a sub-pixel sized image, b) selecting pairs of other detectors, adjacent to and diametrically opposed across the first detector;

c) for each selected pair of detectors comparing the magnitude of the signals from each of the the pair;

d) using the result of said comparisons to determine the position and/or movement of the image within the first detector.

There are many methods known in the prior art for locating an image that is no larger than one detector in an array of detectors, e.g. Vilaire et al in U.S. Pat. No. 5,229,594, so the method for achieving a) above will not be described here. In the following descriptions images are assumed to be of sub-pixel size unless otherwise stated.

In the preferred embodiment of the invention, the comparison (step (c)) comprises determining the ratio of the signal(s) from two detectors located opposite to each other on either side of the first detector. When the image is halfway between these detectors the ratio is equal, and when the image is closer to one detector the ratio moves to favour that detector and reduces in a corresponding manner for the other detector.

The method may also be used to determine the net movement of an object within the field of view of a first detector by comparing the signals of a pair of detectors, diametrically opposed across the first detector, by averaging the ratios of the signals over a period of time. An object which oscillates about a mean position in the field of view of the first detector will give rise to an equal ratio of the signals from the adjacent pair of detectors when their signals are averaged over a period significantly longer than the period of oscillation of the object.

The invention also provides a detector having means for carrying out the above methods.

AN EMBODIMENT OF THE INVENTION

An embodiment of the invention will now be described by way of example only and with reference to the accompanying drawings in which.

Figure 1A:
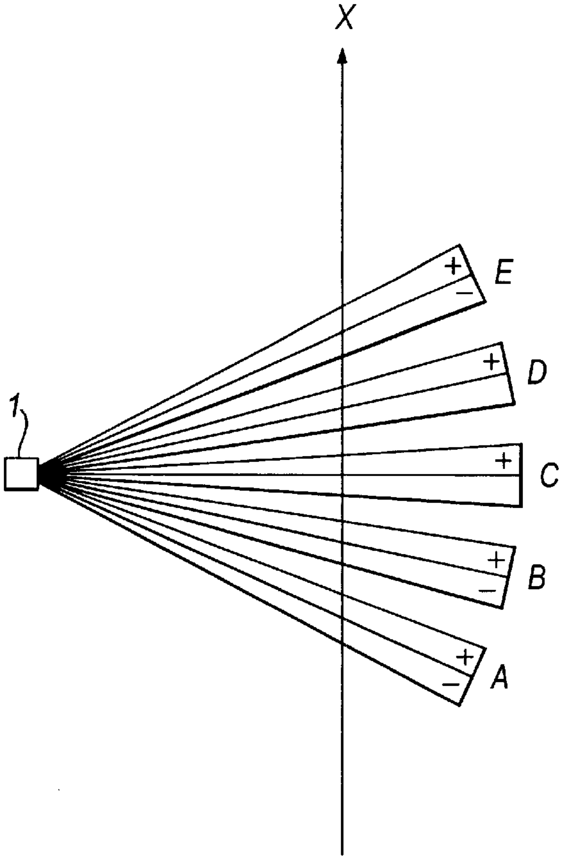
FIG. 1(*a*) is a schematic view of a twin detector pyroelectric sensor and its associated detection zones and FIG. 1(*b*) illustrates typical electric signals generated by the movement of a human across these zones.
Figure 1B:
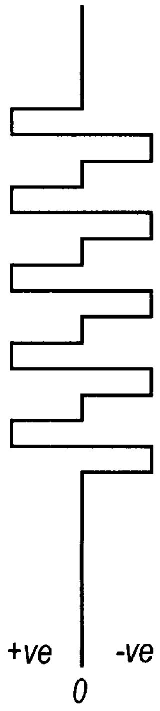
Figure 2A:
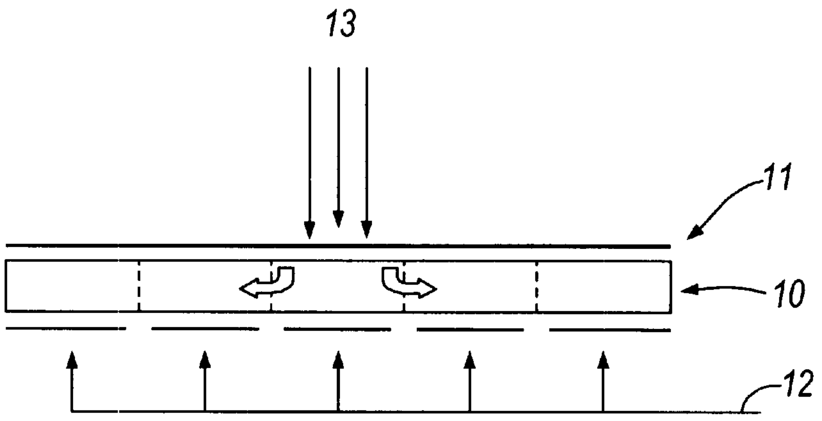
FIG. 2(*a*) is a schematic cross sectional view through an array based detector with a 5×5 array of detectors and FIG. 2(*b*) is a plan view of the same detector viewing a large object.
Figure 2B:
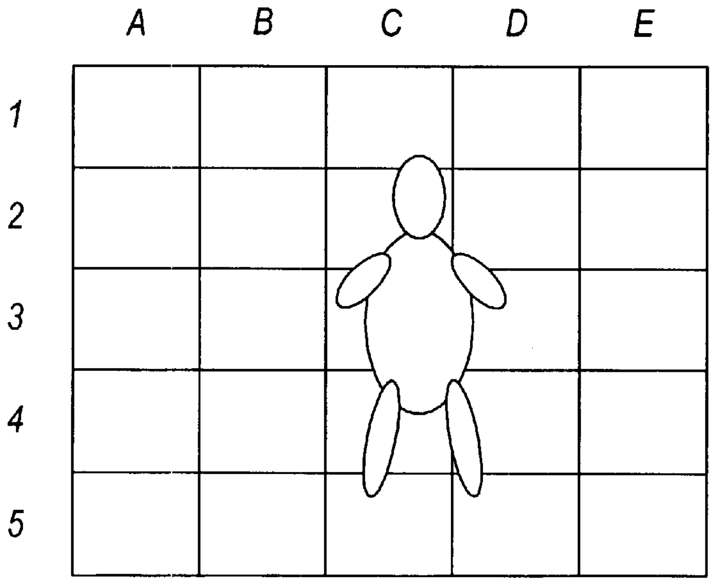
Figure 3:
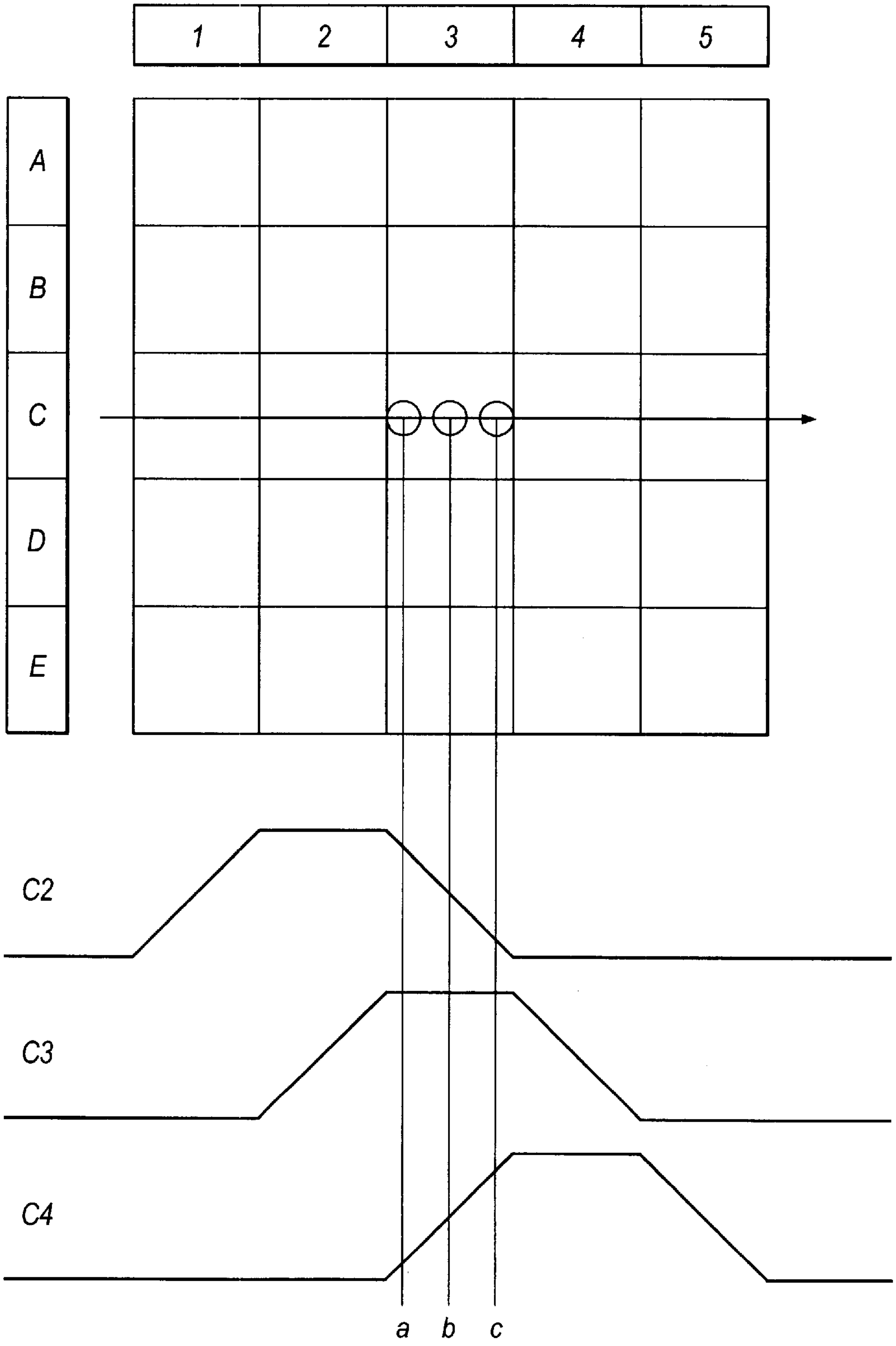

FIG. 3 illustrates a 5×5 array of detectors with the outputs from three detectors shown below the array; and FIG. 2 shows a simplified pyroelectric detector array constructed from a single piece of pyroelectric material 10, with electrodes formed by the deposition of appropriate electrode materials. A common electrode 11 is formed on the top surface and the individual detectors of the array formed by the segmented electrode 12 on the lower surface. In use the array will typically view a scene and energy from the scene will be focussed onto the array by suitable optics. Energy 13 focused on one detector will diffuse laterally through the material and generate signals in adjacent detectors.

The detection of an object moving across the field of view of the array will be explained in a simplified form with reference to FIG. 3, where the rectangular grid represents a 5×5 array, with its columns labelled 1 to 5 and its rows A to E.

If the incident energy is focused on one detector (e.g. C3), the energy will diffuse into the adjacent detectors (B2, B3, B4, C2, C4, D2, D3 and D4). If the energy is focused in the centre of C3, each detector in the opposing pairs of adjacent detectors (C2/C4, B2/D4, B3/D3,), and B4/D2) will have equal signals. The magnitude of the signals in the diagonal pairs (B2/D4 and B4/D2) will be different to those in the vertical and horizontal pairs (C2/C4 and B3/D3) because of the different path lengths from C3, but the ratios of their signal will be the same. When the focus of the energy incident on detector C3 is offset to one edge of that detector, e.g. towards detector C2, more energy will diffuse to the detectors at that side. Consequently the signals generated by detectors C2 and C4 will no longer be equal, with the signal from detector C2 being larger than the signal from detector C4. Corresponding changes occur in the ratios of the other pairs of adjacent detectors. By comparing the ratios of the signals from these pairs of detectors, the location of the focus of the incident energy within detector C can be calculated.

Detection of Movement Within the Field of View of One Detector

The detection of an object moving across the field of view of the array will be explained in a simplified form with reference to FIG. 3. It is assumed that the thermal diffusion length within the pyroelectric material is approximately the same as the detector pitch. The variation in output signals from the three detectors C2, C3 and C4 as an object passes through the field of view of C3 are shown below the array.

Consider a small image moving from left to right along row C. As the image enters the field of view of a detector, an output signal will be generated. If there were no diffusion effects, the signal would rise abruptly as the image crosses the boundary of the detector, stay at a steady level as the image traverses the detector, falling back to its initial value, again abruptly, as the image passes out of the field of view of the detector.

However in the presence of diffusion effects, while the image is still crossing detector C2, a signal that effectively precedes the image starts to appear from detector C3, due to diffusion effects, as can be seen in the output plot for C3 in the section below column 2 in FIG. 3. This signal rises steadily as the image approaches the boundary between C2 and C3, until it reaches its maximum value as the image crosses the boundary between these detectors. This signal level is maintained as the image crosses the field of view of C3, then falls off as the signal leaves C3 and crosses C4, again due to the effect of signal diffusion.

Consider the passage of the image across detector C3. At position "a" the signal from C3 has just reached its maximum value, the signal from C2 has started to fall, and the signal from C4 has just started to rise. As the image moves through positions "b" and "c" there is no change in the value of the signal from C3, but the signals from C2 and C4 continue to fall and rise respectively. When the image is in position "b", the centre of the field of view, the signals from C2 and C4 are equal, while by position "c" the signals from C2 and C4 have reversed their values compared with position "a". In this representation, when the image enters the field of view of C3, the ratio C2:C4 is approximately 9:1, moving linearly through 1:1 at the middle and to 1:9 as the image exits its field of view. It can be seen that by comparing the ratio of the signals from the opposed pair of detectors C2 and C4, while the object crosses the field of view of C3, the location of the object within the field of view of C3 can be calculated. Movement can be sensed in any direction since this process applies equally to all four pairs of opposed detectors adjacent to the object detector, C2/C4, B2/D4, B3/D3 and B4/D2.

Discrimination Between Static and Moving Objects

The method of the invention also provides a means for discriminating between static objects, whose energy output may fluctuate and so make it visible to a pyroelectric detector, and moving objects. As described before, a moving object that enters or leaves the field of view of one detector in an array generates a change in the energy incident on that detector. However a static object that has a fluctuating energy output also generates a change in the energy incident on the detector. By applying the method of this invention, it is possible to discriminate between moving and static objects with fluctuating radiation. In the case of a moving object, the ratio of the signals from at least one of the opposing pairs of detectors adjacent to the detector receiving the incident energy will change as described previously due to the motion through the field of view of the detector. In the case of an object with a fluctuating energy output that is stationary within the field of view of a first detector, although the signal from the first detector will change with the fluctuations, the ratios of all of the signals from the pairs of detectors adjacent to the first detector will remain constant. This is because the focus of the incident energy in the first detector remains at a constant location and so the proportion of this energy that diffuses into the adjacent detectors remains constant.

Discrimination of Objects with No Net Movement

The discrimination between objects moving through the field of view of a detector and other objects can be further enhanced by identifying objects that have an oscillatory movement and exhibit no net movement across the field of view, e.g. a swinging light bulb. Discrimination is achieved by first identifying the detector receiving the incident radiation and selecting an opposing pair of detectors about the first detector whose axis is essentially parallel to the movement of the object. The ratios of the signals from the opposing pairs of elements are averaged over a period of time significantly longer than the period of oscillation of the object. A swinging object will exhibit a very small average movement over a given period of time, compared with a object moving through the field of view, as the movement achieved by the swing in one direction will mostly be cancelled by the movement on the return swing.

Detection of the Onset of Movement

A further capability offered by this technique is the early detection of the onset of movement by a previously stationary object. The pyroelectric detectors of the array are not responsive to stationary objects, but as soon as the object starts to move signals will appear, by the same mechanism as described above, on the adjacent pairs of detectors. By this means the onset of movement of an object can be sensed before it leaves the field of view of the first detector.

Insensitivity to Temperature Differential

The magnitude of the signals generated in pyroelectric detectors is proportional to the difference in temperature between the object and its background.

Because the method uses the ratios of signals from pairs of detectors in opposition about the detector receiving the incident radiation in its detection process, rather than absolute values, this process is less sensitive to the effects of change in background temperature than is normal with conventional detection methods. It is possible to gain some information about the location of the object by determining the ratio of the signal from the detector receiving the incident radiation with that from an adjacent detector (the higher the ratio, the closer is the object to the adjacent detector) but this calculation is open to errors arising from the size and location of the image in the first detector.

What is claimed is:

1. A method for determining the location and/or movement of an object within the field of view of a first detector in an array of pyroelectric detectors constructed from a single piece of material and having an optical system for producing an image of an object on the array, the method comprising:

a) detecting the location of the first detector receiving radiation from said object;

b) selecting pairs of other detectors, adjacent to and diametrically opposed across the first detector;

c) for each selected pair of detectors comparing the magnitude of signals from each of the pair;

d) using the result of said comparisons to determine the position and/or movement of the object within the field of view of the first detector.

2. A method as claimed in claim 1 in which step (c) comprises determining the ratio of the signals being compared.

3. A method as in claim 1 in which the steps of claim 1 are repeatedly applied and the sequence of results used to calculate the speed and/or direction of motion of the object.

4. A method as claimed in claim 3 in which the result of said comparison is used to differentiate between objects that are moving within the field of view of a detector and stationary objects that have varying intensity.

5. A method as claimed in claim 3 in which the result of said comparison is used to determine the net movement of an object in the direction of a line joining said detector pair.

6. A method as claimed in claim 3 in which the result of said comparison is used to detect the onset of movement of a previously stationary object.

7. A sensor comprising;

an array of pyroelectric detectors constructed from a single piece of material;

an optical system for producing an image of an object on the array; and means for determining the position of an object within the field of view of a first detector, comprising means for detecting the location of the first detector receiving radiation from said object, means for selecting pairs of other detectors adjacent to and diametrically opposed across the first to detector, means for each selected pair of detectors for comparing the magnitude of the signals from each detector of the pair and means for determining the position of the object within the field of view of the first detector from the result of said comparisons.

* * * * *